US008331313B2

(12) United States Patent
Watfa et al.

(10) Patent No.: US 8,331,313 B2
(45) Date of Patent: Dec. 11, 2012

(54) EFFICIENT MEDIA INDEPENDENT HANDOVER PROTOCOL OPERATION ENHANCEMENTS

(75) Inventors: Mahmoud Watfa, Montreal (CA); Ulises Olvera-Hernandez, Kirkland (CA); Shamim Akbar Rahman, Montreal (CA)

(73) Assignee: InterDigital Technology Corporation, Wilmington, DE (US)

( * ) Notice: Subject to any disclaimer, the term of this patent is extended or adjusted under 35 U.S.C. 154(b) by 1278 days.

(21) Appl. No.: 11/758,712

(22) Filed: Jun. 6, 2007

(65) Prior Publication Data

US 2008/0008131 A1    Jan. 10, 2008

Related U.S. Application Data

(60) Provisional application No. 60/813,550, filed on Jun. 14, 2006.

(51) Int. Cl.
*H04W 4/00* (2009.01)
(52) U.S. Cl. ........ 370/331; 370/338; 370/328; 370/446; 370/392; 370/254; 455/439; 455/435.1; 455/435.2; 455/436; 455/442
(58) Field of Classification Search .................. 370/331, 370/338, 328, 466, 392, 254; 455/439, 435.1, 455/435.2, 436, 442
See application file for complete search history.

(56) References Cited

U.S. PATENT DOCUMENTS

| 6,167,270 | A | 12/2000 | Rezaiifar et al. |
| 6,397,259 | B1 | 5/2002 | Lincke et al. |
| 7,280,516 | B1 | 10/2007 | Costa et al. |
| 7,359,403 | B1 * | 4/2008 | Rinne ........................... 370/469 |
| 7,483,984 | B1 | 1/2009 | Jonker et al. |
| 2002/0145994 | A1 * | 10/2002 | Mortensen .................... 370/347 |
| 2004/0039830 | A1 | 2/2004 | Zhang et al. |
| 2004/0052259 | A1 | 3/2004 | Garcia et al. |
| 2006/0291421 | A1 | 12/2006 | Park |

FOREIGN PATENT DOCUMENTS

| WO | 03/042981 | 5/2003 |
| WO | 2006/052805 | 5/2006 |

OTHER PUBLICATIONS

Draft IEEE Standard for Local and Metropolitan Area Networks, Jan. 2006, IEEE P802.21-D00.05.pdf.*
Anon, "802.21 Frame Format Considerations", IEEE 802.21 MIHS, (Jun. 20, 2006).

(Continued)

*Primary Examiner* — Charles Appiah
*Assistant Examiner* — Alexander Yi
(74) *Attorney, Agent, or Firm* — Volpe and Koenig, P.C.

(57) ABSTRACT

The present invention modifies existing media independent handover (MIH) function (MIHF) frame format as defined by the IEEE 802.21 standard. In one embodiment, the variable load of the MIHF frame is modified to eliminate the MIHF variable header by defining the MIHF identification (ID) field and the session ID field as fixed fields in the MIHF fixed header. Thus, the MIHF variable load is only made up of the MIHF payload. In another embodiment, a field such as an information element (IE), a header, or MIH service data such as a command or an event, is represented by a type field, a length field and a value field (TLV). The length of the value field is exactly 128 octets, and the length field only occupies one octet.

10 Claims, 7 Drawing Sheets

OTHER PUBLICATIONS

Anon, "Media Independent Handover—Discussion on IDs in Primitives", IEEE 802.21 Media Independent Handover Services, (Mar. 2006).

IEEE, *Draft IEEE Standard for Local and Metropolitan Area Networks: Media Independent Handover Services*, IEEE P802.21/D01.00.

IEEE, *Draft IEEE Standard for Local and Metropolitan Area Networks: Media Independent Handover Services*, IEEE P802.21/D00.05 (Jan. 2006).

IEEE, *Draft Standard for Local and Metropolitan Area Networks: Media Independent Handover Services*, IEEE P802.21/D05.00, (Apr. 2007).

Rajkumar et al., "Teleconference Meeting Minutes of the IEEE P802.21 Working Group", D00-05 Comment Resolution Ad Hoc, IEEE P802 Media Independent Handover Services, (Feb. 21, 2006).

Anon, "Media Independent Handover —Discussion on IDs in Primitives", IEEE 802.21 Media Independent Handover Services, (Mar. 2006).

* cited by examiner

| TYPE | LENGTH | VALUE |
|------|--------|-------|

FIG. 3
PRIOR ART

| TYPE | FIRST OCTET | SECOND OCTET | ... | Nth OCTET | VALUE |
|------|-------------|--------------|-----|-----------|-------|
|      | 1 x x x x x x x | y y y y y y y y | ... | z z z z z z z z | (GREATER THAN 128 OCTETS) |

INDICATE THE # (N) OF EXTRA LENGTH FIELD OCTETS THAT ARE APPENDED FURTHER

ADDITIONAL LENGTH FIELD OCTETS AND THEIR VALUE WHEN ADDED TO 128 INDICATE THE TOTAL LENGTH OF THE VALUE FIELD IN OCTETS

FIG. 4

| TYPE | LENGTH | VALUE |
|------|--------|-------|
|      | 10000000 | (EXACTLY 128 OCTETS) |

EFFICIENT MEDIA INDEPENDENT HANDOVER PROTOCOL OPERATION ENHANCEMENTS

CROSS REFERENCE TO RELATED APPLICATION

This application claims the benefit of U.S. Provisional Application No. 60/813,550 filed Jun. 14, 2006, which is incorporated by reference as if fully set forth.

FIELD OF INVENTION

The present invention relates to wireless communications. More particularly, the present invention relates to a media independent handover function (MIHF) frame format used to wirelessly transmit and receive media independent handover (MIH) messages.

BACKGROUND

Figure 1:
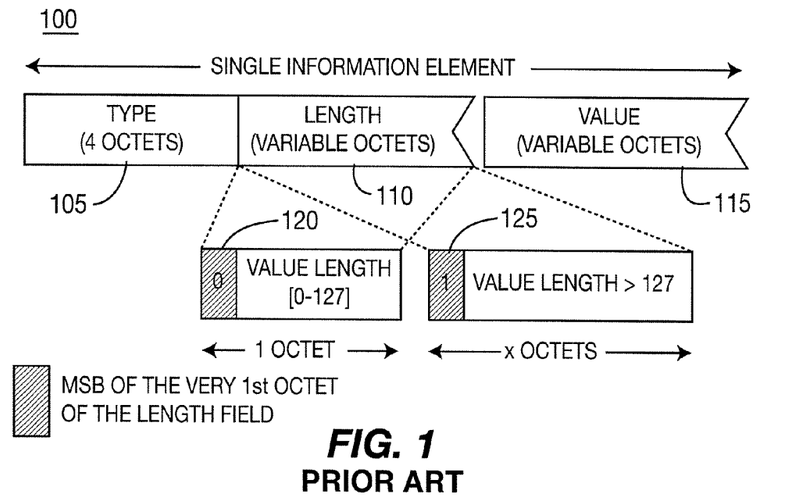
FIG. 1 shows the current TLV format representation of an IE as specified by the IEEE 802.21standard.

FIG. 1 shows the current type-length-value (TLV) representation of an IE 100 including a type field 105, a length field 110 and a value field 115, as specified by the IEEE 802.21 standard. Alternatively, the TLV fields may represent other fields such as a header, or MIH service data such as a command or an event.

The type field 105 indicates the type of the IE and has defined identification (ID) values in the IEEE 802.21 standard. The value field 115 contains the payload or the value of the IE 100. In a first scenario, if the number of octets occupied by the value field 115 is less than or equal to 127, the size of the length field 110 is always one (1) octet and the most significant bit (MSB) 120 of the octet is set to the value '0'. In a second scenario, if the number of octets occupied by the value field 115 is greater than 127, then the size of the length field 110 is at least "x" octets, where "x" is greater than or equal to two (2). In this case, the MSB 125 of the first octet of the length field 110 is set to the value '1' and the remaining 7 bits of the first octet indicate the number of additional octets that are appended to the first octet. The number represented by the second octet of the length field 110 indicates the total size of the value field 115.

There is a problem with the length field explanation as specified in IEEE 802.21. Specifically, in the second scenario of the length field interpretation, the IEEE 802.21 standard specifies that the number represented by the second octet of the length field indicates the total size of the value field. This is inaccurate because the number represented by the second octet does not indicate the length of the value field. Instead, the number represented by the additional appended octets, starting from the second octet, indicates the length of the value field. In addition, the value of the additional octets should represent the length of the value field in octets as opposed to bits. Thus, the length field is not efficiently used.

Figure 2:
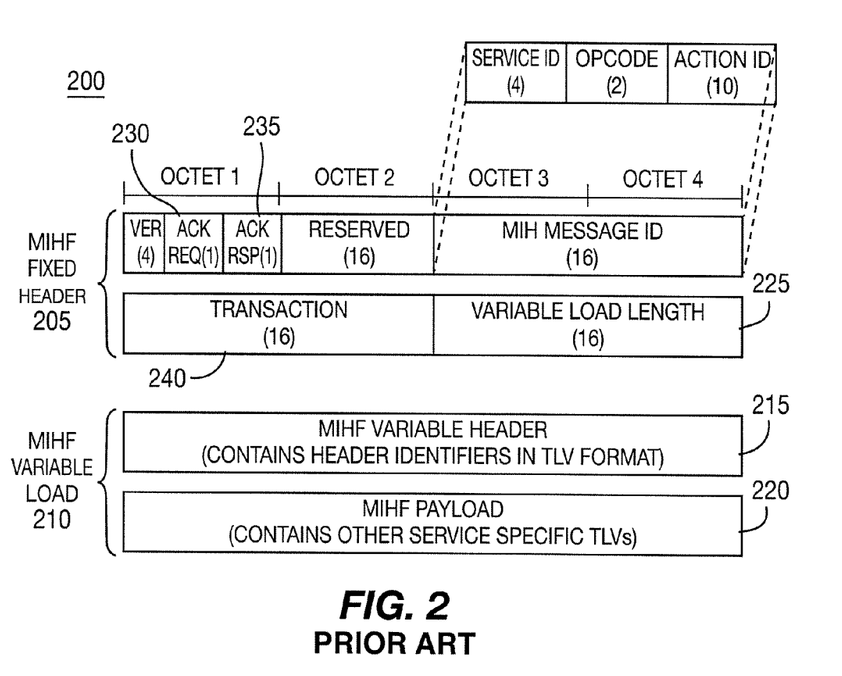
FIG. 2 shows the current IEEE 802.21 MIHF frame format.

FIG. 2 shows the current format of an MIHF frame 200 specified by the IEEE 802.21 standard. The IEEE 802.21 standard specifies that the MIHF frame 200 is composed of an MIHF fixed header 205 and an MIHF variable load 210. The MIHF variable load 210 is composed of an MIHF variable header 215 and an MIHF payload 220.

The IEEE 802.21 standard specifies that the MIHF fixed header 205 is mandatory. Table 1 below shows the contents of the MIHF fixed header 205 as specified in IEEE 802.21:

TABLE 1

MIHF Fixed Header Description

| Field Name | Size (bits) | Description |
|---|---|---|
| Version | 4 | This field is used to specify the version of protocol used. The importance of this is seen in downwards compatibility handling in the future. |
| ACK-Req | 1 | This field is used for requesting an acknowledgement for the message. |
| ACK-Rsp | 1 | This field is used for responding to the request for an acknowledgement for the message. |
| Reserved | 4 | This field is intentionally kept reserved. In un-used case, it all the bits of this field are to be set to '0'. |
| MIH Message ID (MID) | 16 | Combination of the following 3 fields. |
| Service Identifier (SID) | 4 | Identifies the different MIH services, possible values are:<br>1: System Management<br>2: Event Service<br>3: Command Service<br>4: Information Service |
| Operation Code (Opcode) | 3 | Type of operation to be performed with respect to the SID, possible values are:<br>1: Request<br>2: Response<br>3: Indication |
| Action Identifier (AID) | 9 | This indicates the action to be taken with respect to the SID. |
| Number of Additional Header Identifiers | 8 | Indicates the number of header identifiers (TLV for each) included in the variable MIHF header part. |
| Transaction ID | 16 | This field is used for matching Request and Response as well as matching Request, Response and Indication to an ACK. |
| Variable Load Length | 16 | Indicates the total length of the variable load embedded into the MIHF frame and is the sum of MIHF variable header length and MIHF payload length. MIHF fixed header length is NOT included. |

As currently specified in IEEE 802.21, the MIHF variable header 215 contains additional identifiers that help to analyze and coordinate the payload that is embedded. These identifiers are also represented in TLV format. Some possible values for the type field (of the TLV) of these identifiers specified in IEEE 802.21 include transaction ID (to match requests and responses), MIH Function ID/Session ID (to identify the communication peers), and synchronization information (to identify the timestamp of the received message).

The MIHF payload field 220 contains service specific TLVs that act as the payload of a message. Comparing the MIHF fixed header 205 in FIG. 2 (MIHF frame format) and the description of its fields in Table 1 (MIHF fixed header description), it should be noted that the "number of additional header identifiers" field that is shown in Table 1 does not exist in the MIHF frame 200 of FIG. 2.

The variable load length field 225 of the MIHF fixed header 205 is represented by 16 bits. The variable load length field 225 (as specified in IEEE 802.21) indicates that the total length of the variable load embedded into the MIHF frame 200 and is the sum of the length of the MIHF variable header 215 and the length of the MIHF payload 220. The length of the MIHF fixed header 205 is not included.

The variable load length field 225 is not necessary because the length of the MIHF variable header 210 can be calculated and the 16 bits used for its representation should be economized.

The MIHF fixed header 205 defines an acknowledgement request (ACK-req) field 230 to request an acknowledgment, and an acknowledgement response (ACK-rsp) field 235 to acknowledge receipt of a message. As specified in IEEE 802.21, acknowledgement messages are either attached ("piggy-backed") or sent alone in a response packet. However, the IEEE 802.21 standard does not specify how to indicate that a response frame has no payload and serves as acknowledgement only. Thus, if a peer receives a message with the ACK-rsp bit set to '1', it would have to check if there is payload or not. This is not efficient because if there is no payload, the MIHF variable load field 210 would contain dummy bits that might be interpreted as valid bits by the receiver. Thus, it is necessary to have a field that identifies pure acknowledgement messages and the MIHF frame 200 should have no MIHF variable load field 210. Currently there is no such field defined.

The IEEE 802.21 standard defines three MIHF protocol identifiers including an MIHF ID, a session ID and a transaction ID 240. The MIHF ID identifies the sender from where the MIHF frame 200 originated. The session ID is a unique identifier generated by the originator of a session. The transaction ID 240 is used for matching requests and responses, as well as matching request, response and indication to an ACK (see Table 1 above).

Thus, all of the three MIHF protocol identifiers (together) uniquely identify an MIHF frame (or message). However, only the transaction ID 240 is shown in the MIHF fixed header 205 whereas the MIHF ID, the session ID, and transaction ID 240 are supposed to be represented in TLV format and are specified to reside in the MIHF variable header 215 (which is part of the MIHF variable load 210). The problem is that using a TLV to represent each of the MIHF ID and the session ID will waste bits and complicate the decoding of the MIHF frame 200. In addition, the transaction ID 240 has already been granted a fixed field in the MIHF fixed header 205 and there is no need to re-represent it in TLV format in the MIHF variable header 215.

SUMMARY

The present invention includes a set of modifications to the existing MIHF frame format in the IEEE 802.21 standard. The present invention modifies existing MIHF frame format as defined by the IEEE 802.21 standard. In one embodiment, the variable load of the MIHF frame is modified to eliminate the MIHF variable header by defining the MIHF ID field and the session ID field as fixed fields in the MIHF fixed header. Thus, the MIHF variable load is only made up of the MIHF payload. In another embodiment, a field such as an IE, a command or a header is represented by a type field, a length field and a value field (TLV). The length of the value field is exactly 128 octets, and the length field only occupies one octet.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION OF THE PREFERRED EMBODIMENTS

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Figure 3:
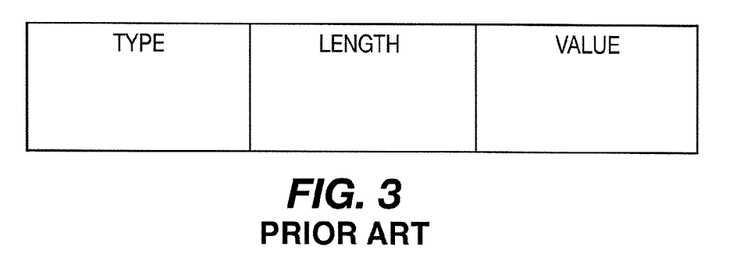
FIG. 3 shows the current TLV format specified by IEEE 802.21.

FIG. 3 shows the current TLV format Representation of an IE as defined in IEEE 802.21, similar to the format of the IE 100 shown in FIG. 1. The present invention is applicable to the interpretation of the length field of the TLV when the length of the value field is greater than 127 octets.

Figure 4:
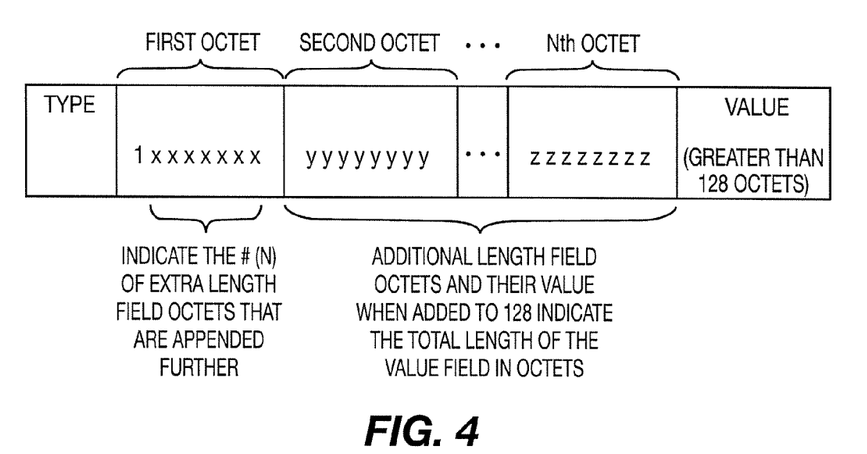
FIG. 4 shows a TLV frame with a value field having a length greater than 128 octets.

As shown in detail by FIG. 4, if the number of octets occupied by the value field is greater than 128 octets, then the MSB of the first octet of the length field is set to '1'. The rest of the seven bits indicate the number of octets (of new length fields) that are further appended to the first octet (of the length field). The length of the value field is then 128 plus the number represented by the other appended length field octets starting from the second octet.

Figure 5:
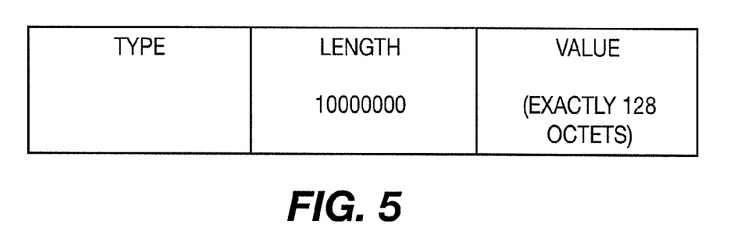
FIG. 5 shows a TLV frame with a value field having a length of exactly 128 octets in accordance with the present invention.

The present invention defines a third case which applies when the length of the value field is exactly 128 octets as shown in FIG. 5. If the length of the value field is exactly 128 octets, then the MSB of the length field is set to '1' and the remaining seven bits are set to '0'. In accordance with the current IEEE 802.21 standard, if the length is greater than 127 octets, as shown in FIG. 1, extra octets 'x' must be added to fully indicate the length of the value field. Even if the length is exactly 128 octets, the current IEEE 802.21 standard requires an extra octet to meet the exact value of 128 octets. Thus, there is a waste of an extra octet. The present invention does not require additional octets to indicate the length of the value field in octets when the length of the value field is exactly 128 octets.

Figure 6:
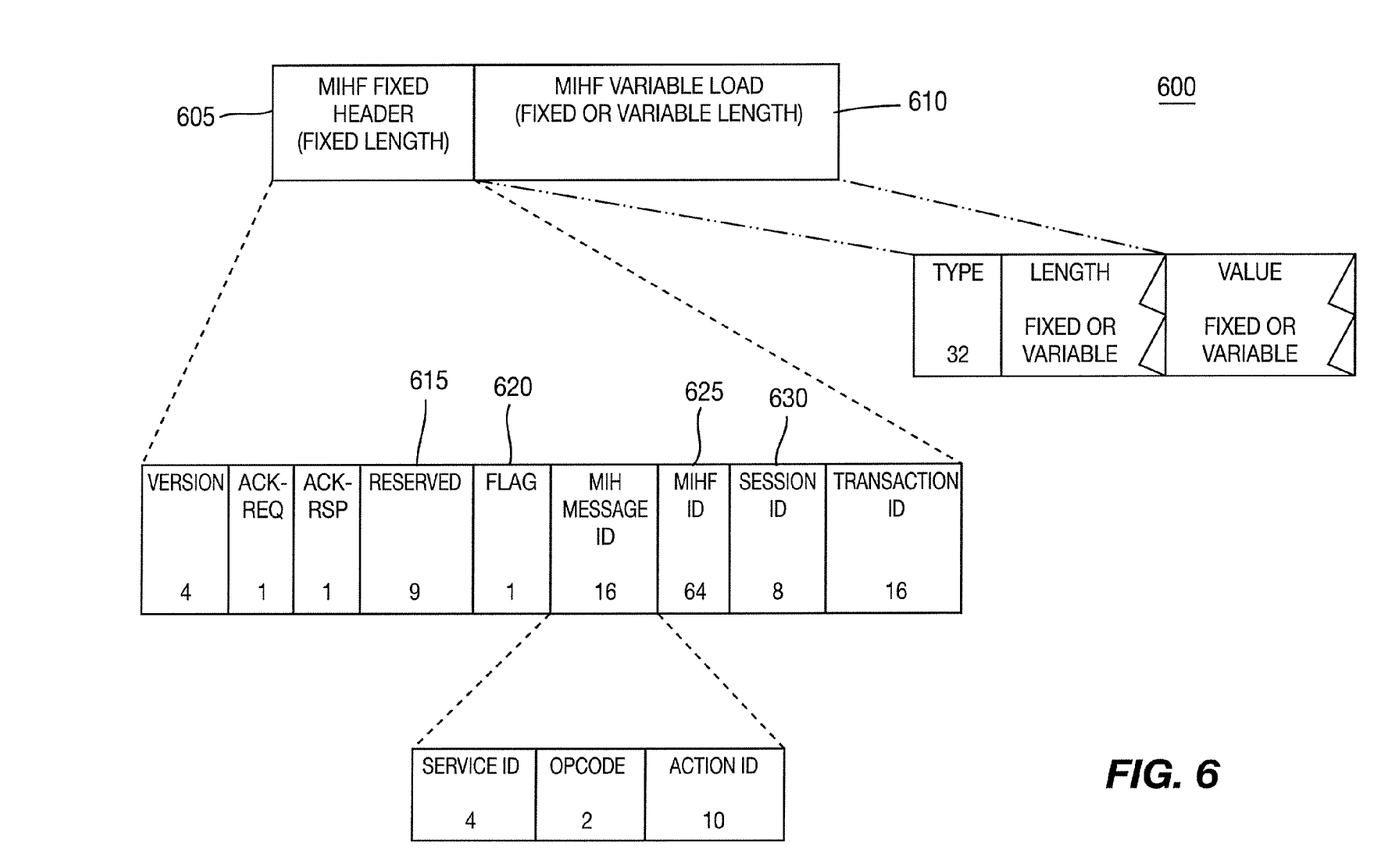
FIG. 6 shows an MIHF frame format configured in accordance with the present invention.

FIG. 6 shows an MIHF frame format 600 configured in accordance with the present invention. The MIHF frame format 600 includes an MIHF fixed header 605 and an MIHF variable load 610. However, the MIHF variable header, (which is part of the MIHF variable load of the current IEEE 802.21 MIHF frame), has been removed. This is so because the MIHF ID and the session ID which were previously represented in TLVs and which were contained in the MIHF variable header are now defined as fixed fields in the MIHF fixed header 605 in accordance with the present invention.

Thus, the MIHF variable load 610 is only made up of the MIHF payload.

The field names of the MIHF fixed header 605 that are shown in FIG. 6 are either new fields that are defined or old fields that have been modified in accordance with the present invention.

The Reserved field 615 has been modified. It was initially represented by 10 bits and now it should be represented by 9 bits. The other bit is used to define a "flag" field 620 in accordance with the present invention. There are two scenarios of how this field can be used.

In a first scenario, when there is payload in the MIHF variable payload field (of the MIHF Frame), the flag field 620 is set to '1'. In this scenario, the total length of the MIHF frame would be: {[length of MIHF fixed header (always 15 octets)]+[length of MIHF variable load]}octets={15+[length of the type field (always 4 octets)]+[the number of octets used to represent the length field]+[the length of the value field as indicated by the Length field] octets. This can be used to attach ("piggy-back") an acknowledgement for a previously received message. Thus, an indication that there is a "piggybacked" acknowledgment in the frame which also contains payload occurs when the ACK-rsp and flag bits are set to '1'.

In a second scenario, when there is no payload in the MIHF variable payload field (of the MIHF frame), then the flag field 620 is set to '0'. In this case, the total length of the MIHF frame would be: [length of MIHF fixed header (always 15 octets)]. This is particularly useful if a peer needs to send an MIHF frame that contains an acknowledgement message only.

The current IEEE 802.21 standard does not distinguish stand-alone acknowledgement messages. Instead, the current IEEE 802.21 standard always uses attached ("piggy-backed") acknowledgement messaging. Thus, if a peer sends an MIHF frame containing an acknowledgement message only, the ACK-rsp is set to '1' and the flag bit is set to '0'. In this scenario, the MIHF variable load carries no data and hence does not exist. Therefore, the MIHF frame only includes the MIHF fixed header, and the receiver does not attempt to check for any payload.

The MIHF ID field 625 plays the same role as already specified in IEEE 802.21—MIHF ID of the sender from where the MIHF frame originated. However, this field is not contained in the current MIHF fixed header in IEEE 802.21. The significance of having this field in this header is that it will always be needed for unique identification of every message that is sent. Thus, if represented in TLV format, it will occupy extra bits that can be used for other purposes. In addition, its TLV representation would introduce more effort and overhead while decoding a message.

The session ID 630 has the same function as already specified in IEEE 802.21—a unique identifier generated by the originator of a session. However, to uniquely define a sender of a message, the Session ID is needed. Similarly, having this ID in the MIHF fixed header economizes bits and enhances decoding of messages as opposed to representing it in TLV format.

The variable load length field is removed from the MIHF fixed header. The role of this field is to indicate the length of the MIHF variable payload field and was made up of 16 bits. However, even in the absence of the variable load length, the length of the MIHF variable payload field can still be calculated as follows: {[length of the Type field (always 4 octets)]+ [the number of octets used to represent the Length field]+[the length of the value field as indicated by the Length field] }Octets. Thus, the 16 bits can be economized without losing any information such as the length of the MIHF variable payload. The rest of the fields of the MIHF fixed header are described by Table 1 above.

The MIHF variable load part of the MIHF frame format contains service specific TLVs only. It no longer contains the MIHF variable header. The following is an example implementation of the MIHF frame of the present invention.

To retrieve specific IEs, for example, the client sends an information request (i.e., query) to an MIH point of service (PoS). The information request contains a query for IEs. The MIH PoS sends an information response which contains the response of the information request back to the client.

Figure 7:
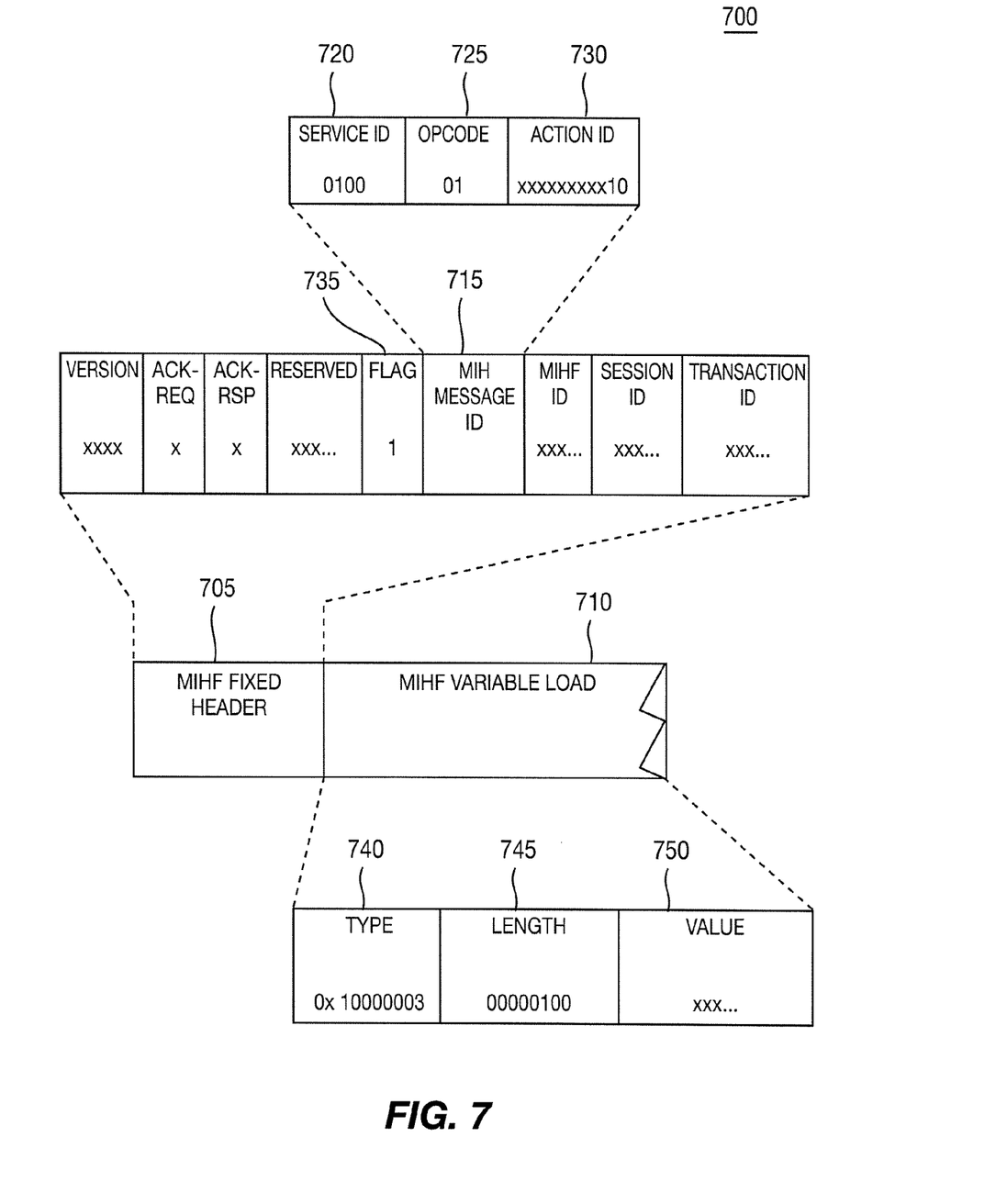
FIG. 7 shows an exemplary MIHF request frame for requesting an IE in accordance with the present invention.

FIG. 7 shows an exemplary MIHF request frame 700 for requesting an IE. An IEEE 802.21 enabled entity requests for a specific IE such as a list of operators (e.g., using TYPE_IE_LIST_OF_OPERATORS_REQUEST). The MIHF request frame 700 includes an MIHF fixed header 705 and an MIHF variable load 710.

The 'xxx' contained by the fields of the MIHF fixed header 705 of the MIHF request frame 700 shown in FIG. 7 simply implies that the bits can have any value without affecting the implementation of the request frame 700. The MIH message ID field 715 is a combination of a service ID field 720, an operation code (opcode) field 725 and an action ID field 730.

The service ID field 720 identifies the different MIH services and has the following values:
1=System Management;
2=Event Service;
3=Command Service; and
4=Information Service.

As shown in FIG. 7, the service ID field 720 has a decimal value of 4 that is represented in the binary bits "0100". This value indicates that the payload carried in the MIHF variable load 710 is related to information service.

The operation code (opcode) field 725 indicates a type of operation to be performed with respect to the service ID 720 and has the following values:
1=Request;
2=Respond; and
3=Indication.

As shown, the operation code (opcode) field 725 is represented by a value of 1 to indicate that the payload is a request for the service ID in question.

The action ID field 730 indicates the action to be taken with respect to the service ID field 720.

The flag field 735 as shown is set to '1' indicating that the MIHF variable load contains data.

The MIHF variable load 710 of the request message part of the MIHF frame 700 contains the TLV representation for the IE request defined by a type field 740, a length field 745 and a value field 750.

The type field 740 contains the value for the type of IE. In the example shown in FIG. 7, the type field 740 is represented in hexadecimal notation with a value of "0x10000003" (4 octets) as specified in IEEE 802.21. This means that the type of IE in question is the list of operators for a specific link type, which is specified in the value field of the TLV ('xxx . . . ').

The length field 745 has its MSB set to '0' meaning that the length of the value field is less than 128 octets. The exact length of the value field is represented by the rest of the seven bits which have a decimal value of 4. Therefore, the length of the value field is 4 octets.

The value field 750 contains the specific link type for which it is required to obtain the list of operators. The value field 750 field can be of fixed or variable length depending on the IE in question. For this example, it is specified in IEEE 802.21 that the length of this field is fixed to 4 octets. It is represented by 'xxx . . . ' because it can represent any defined value.

Figure 8:
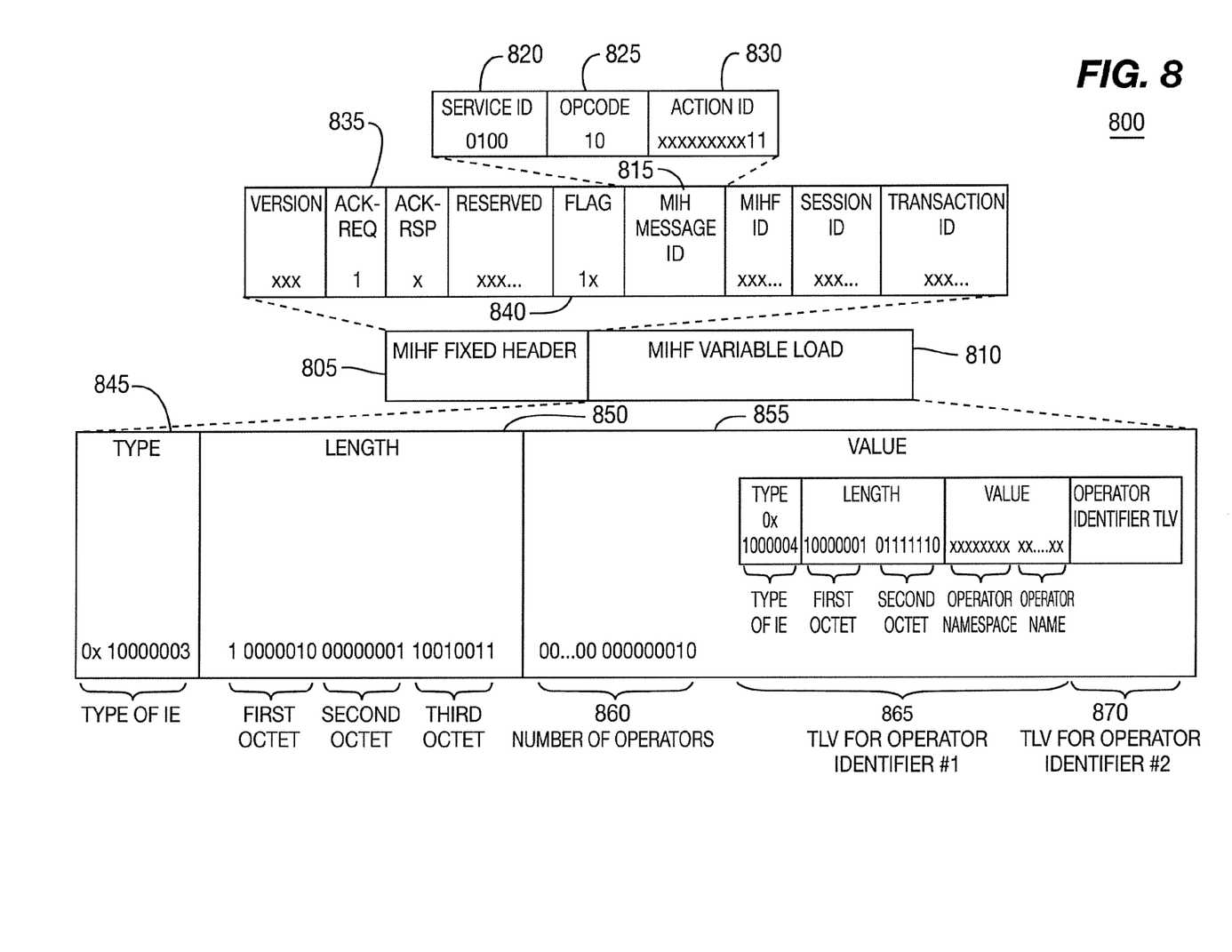
FIG. 8 shows an exemplary MIHF response frame which provides an IE in response to the MIHF request frame in accordance with the present invention.

FIG. 8 shows an exemplary MIHF response frame 800 which provides an IE in response to the MIHF request frame 700. It is assumed that the receiver of the request message decodes the MIHF frame accordingly and responds, (e.g., using TYPE_IE_LIST_OF_OPERATORS_RESPONSE). The MIHF response frame 800 includes an MIHF fixed header 805 and an MIHF variable load 810. The MIHF response frame 800 shows the response to the request for the list of operators IE (for a specific link type).

The 'xxx' contained by the fields of the MIHF fixed header 805 of the MIHF response frame 800 shown in FIG. 8 simply implies that the bits can have any value without affecting the implementation of the response frame 800. The MIH message ID field 815 is a combination of a service ID field 820, an operation code (opcode) field 825 and an action ID field 830.

The ACK-req field 835 has a bit that is set to '1', indicating that the peer should acknowledge the receipt of this message (as specified in IEEE 802.21).

The flag field 840 has a bit that is set to '1' indicating that the MIHF variable load contains data.

The service ID bit 820 has a decimal value of 4 that is represented in bits. This value implies that the payload carried in the MIHF frame is related to information service.

The operation code (opcode) field 825 is represented by a decimal value of 2 to indicate that the payload is a response for the service ID in question.

The action ID field 830 indicates the action to be taken with respect to the service ID field 820.

The MIHF variable load 810 of the response message field has three fields that are explained below.

The type field 845 contains the value for the type of IE. In this example, it is represented in hexadecimal notation with a value of 0x 10000003 (4 octets) as specified in IEEE 802.21. This means that the type of IE in question is the list of operators for a specific link type, (which was specified in the value field of the TLV of the request message).

The length field 850 has its MSB set to '1' meaning that the length of the value field is greater than 128 octets. The rest of the seven bits of the first octet of this field indicate that two length field octets are appended further (16 bits). The decimal value represented by these 16 bits is 403. Therefore, the total length of the value field is 128+403=531 octets.

The value field 855 contains the payload. According to the specification of the IEEE 802.21, this field is made up of two parts: the number of operators (for the specific link type) followed by the operator identifier(s).

The number of operators field 860 is represented by 4 octets as specified in IEEE 802.21. For the sake of this example, the number of operators for the link type in question is chosen to be 2. This value is shown as the first four octets in the value field 915 of the MIHF variable load shown in FIG. 9.

The operator identifiers are represented in TLV format. Each is treated as a separate IE that is first built and then added to the value field after the number of operator identifiers. Thus, two independent operator identifier TLVs 865 and 870 are present. The TLVs 865 and 870 are similar in structure but may vary in content and length. Note that this is assumed because the operator name is not yet defined. The two TLVs 865 and 870 are appended to the number of operators in the value field 855, (which is in the MIHF variable load 810). Each TLV 865 and 870 has the same value for the type field, but the length field and the value field may vary. Thus, it could be suggested that the type field of the appended TLVs 865 and 870 be removed. The value field 855 of the response frame 800 would thus contain 4 octets for the number of operators, a length field for the first operator identifier TLV 865 followed by its value field, and a length field for the second operator identifier TLV 870 followed by its value field. Note that this cannot be done for all IE requests or responses because sometimes the TLVs to be appended are different and so their type field is required.

Figure 9:
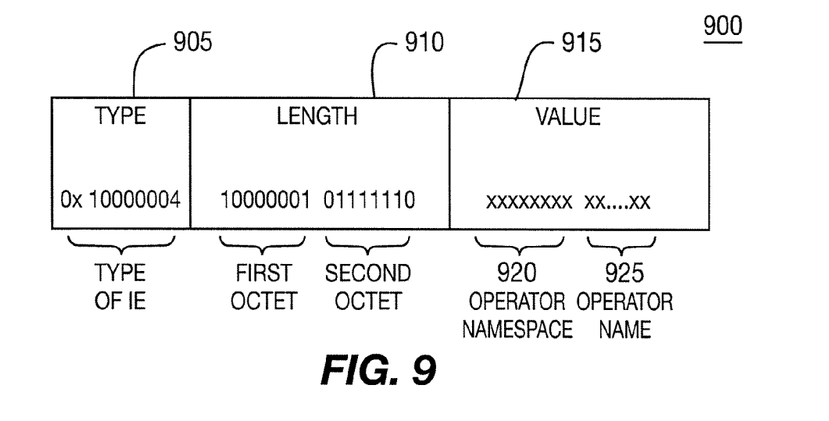
FIG. 9 shows an exemplary TLV representation for an operator identifier IE in accordance with the present invention.

FIG. 9 shows an exemplary TLV representation of an operator identifier IE 900. The type field 905 contains the value for the type of IE. In this example, it is represented in hexadecimal notation with a value of 0x 10000004 (4 octets) as specified in IEEE 802.21. This means that the type of IE in question is the operator identifier. The length field 910 has its MSB set to '1', indicating that the length of the value field 915 is greater than 128 octets. The rest of the seven bits of the first octet of the length field 910 indicates that one length field octet is appended further (8 bits). The decimal value represented by these 8 bits is 126. Therefore, the total length of the value field 915 is 128+126=254 octets.

The value field 915 includes an operator namespace field 920 followed by an operator name field 925. The operator namespace field 920 has a length of 1 octet as specified in IEEE 802.21. The operator name field 925 contains the value of the name of the operator in question. The operator name field 925 is a non-null terminating string whose length shall not exceed 253 octets, (as specified by the IEEE 802.21 standard). Field 925 is shown as including "xx . . . xx", which is used to represent any value since the possible values are not yet defined in the IEEE 802.21 standard. Thus, the operator name field 925 is assumed to be having the maximum length, i.e., 253 octets, just for the sake of the example.

Figure 10:
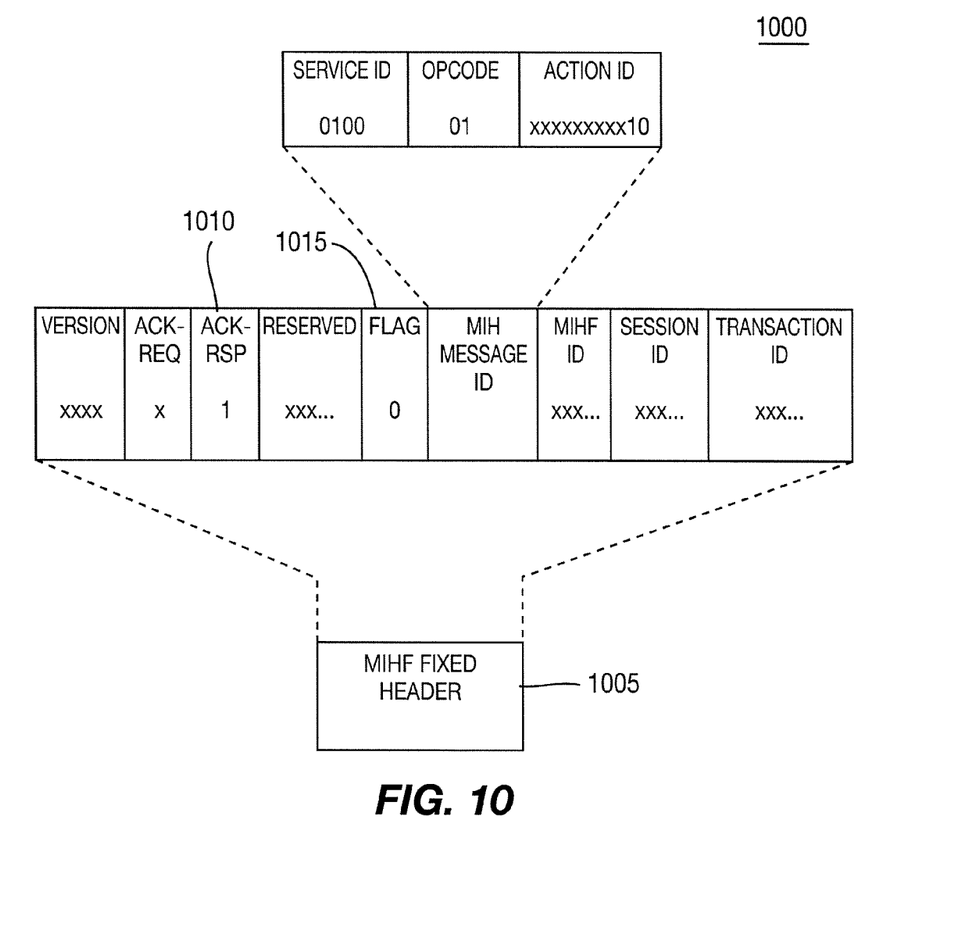
FIG. 10 shows an MIHF frame with an acknowledgement message in accordance with the present invention.

When a receiver receives an MIHF response message, the receiver decodes the frame accordingly and notices that the ACK-req bit was set to '1' by the peer. In accordance with the present invention, the receiver then sends a frame including an acknowledgement message 1000, which only includes an MIHF fixed header 1005, as shown in FIG. 10. In the MIHF fixed header 1005, an ACK-rsp bit 1010 is set to '1' indicating that this frame contains an acknowledgement for a previous message. Furthermore, a flag bit 1015 is set to '0' indicating that there is no payload in the MIHF variable load, (which is absent). Thus, this frame contains an acknowledgment message only.

The rest of the fields, and the values they should contain, are specified by the IEEE 802.21 standard. Thus, the receiver can distinguish pure acknowledgement messages by checking the flag bit 1015.

Figure 11:
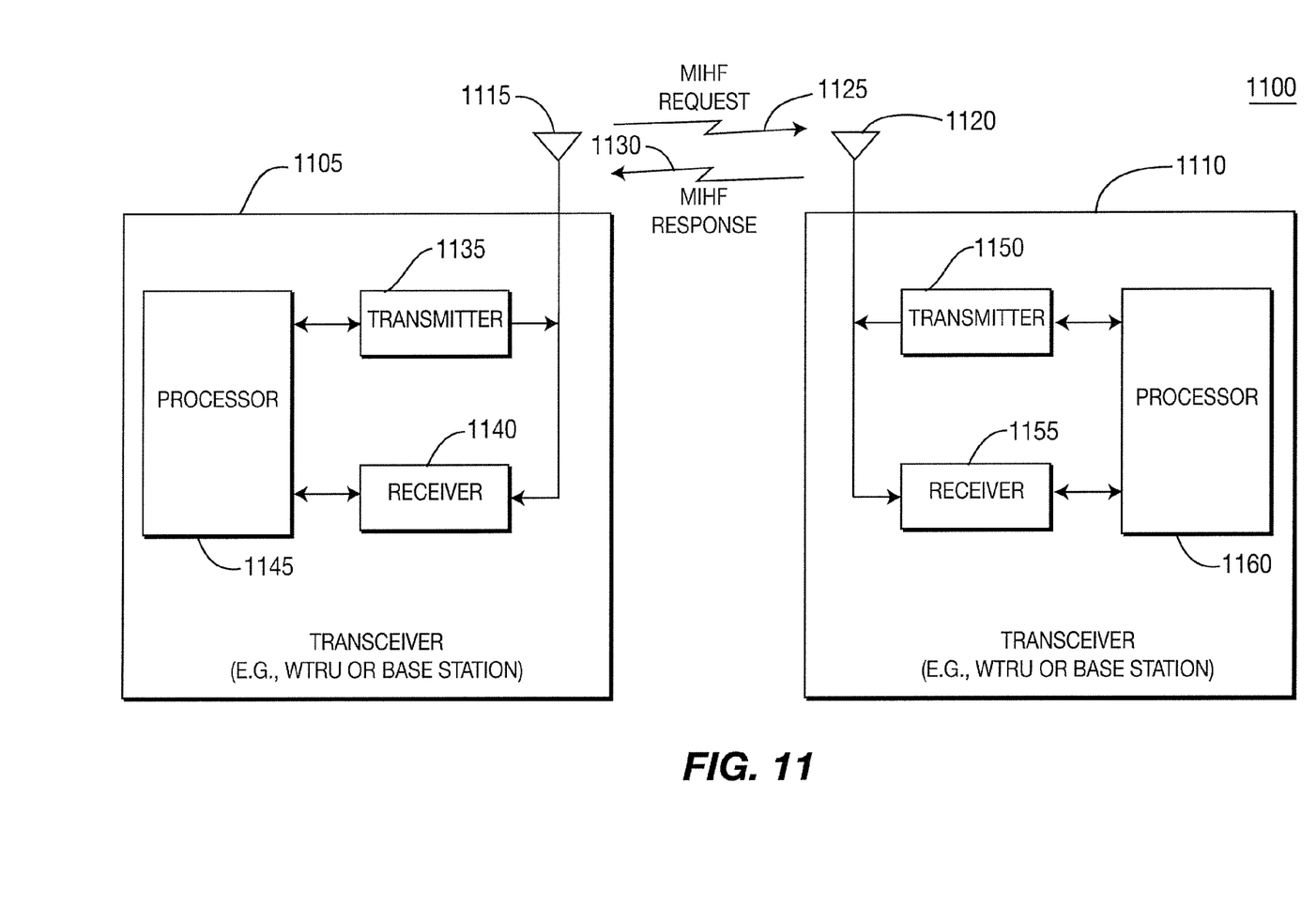
FIG. 11 shows a communication system configured in accordance with the present invention.

FIG. 11 shows a wireless communication system 1100 including a first transceiver 1105 and a second transceiver 1110 configured in accordance with the present invention. The first transceiver 1105 and the second transceiver 1110 may be a wireless transmit/receive unit (WTRU), a base station and the like. Alternatively, a wired communication system may be implemented, e.g., using Ethernet as the physical connection.

As shown in FIG. 11, the first transceiver 1105 includes a first antenna 1115 and the second transceiver 1110 includes a second antenna 1120. The first transceiver 1105 sends an MIHF request frame 1125 to the second transceiver 1110 via the first antenna 1115. The MIHF request frame 1125 includes an MIHF fixed header and an MIHF variable load. The MIHF variable load in the MIHF request frame 1125 does not include an MIHF variable header. The second transceiver 1110 sends an MIHF response frame 1130 to the first transceiver 1105 via the second antenna 1120 in response to receiving the MIHF request frame 1125. The MIHF response frame 1130 includes an MIHF fixed header and an MIHF variable load. The MIHF variable load in the MIHF response frame 1130 does not include an MIHF variable header.

The transceiver 1105 further includes a transmitter 1135 for sending MIHF request frames 1125 and MIHF response frames 1130, a receiver 1140 for receiving MIHF request frames 1125 and MIHF response frames 1130, and a processor 1145 for generating MIHF request frames 1125 and MIHF response frames 1130.

The transceiver 1110 further includes a transmitter 1150 for sending MIHF request frames 1125 and MIHF response frames 1130, a receiver 1155 for receiving MIHF request frames 1125 and MIHF response frames 1130, and a processor 1160 for generating MIHF request frames 1125 and MIHF response frames 1130.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method for use in a wireless communication device, the method comprising: the wireless communication device generating a MIHF (media independent handover (MIH) function) frame that includes a type-length-value (TLV) parameter, wherein the TLV parameter includes a type field, a length field, and a value field, the length field indicates a length of the value field, and on a condition that the length of value field is less than 128 octets, the length field consists of one octet, a most significant bit (MSB) of the length field has a value of zero, and seven least significant bits of the length field indicate the length of the value field, on a condition that the length of the value field is exactly 128 octets, the length field consists of one octet, the MSB of the length field has a value of one, and the seven least significant bits of the length field each have a value of zero, and on a condition that the length of the value field is more than 128 octets, the length field includes two or more octets that include a first octet and one or more subsequent octets, a MSB in the first octet in the length field has a value of one, seven least significant bits in the first octet in the length field indicate a length of the one or more subsequent octets, and a value of the one or more subsequent octets, when added to a value of 128, indicate the length of the value field; and the wireless communication device transmitting the frame via a wireless network.

2. The method of claim 1, wherein the frame includes an MIH header and a payload, the TLV parameter is included in the payload, and the MIH header includes a version field, an acknowledgement-request (Ack-Req) field, an acknowledgment-response (Ack-Rsp) field, an MIH Message ID field, and a Transaction ID field.

3. The method of claim 1, wherein the wireless communication device is a wireless transmit/receive unit (WTRU).

4. The method of claim 1, wherein the wireless communication device is a user equipment (UE).

5. The method of claim 1, wherein the wireless communication device is a base station.

6. A wireless communication device comprising: a processor configured to generate a MIHF (media independent handover (MIH) function) frame that includes a type-length-value (TLV) parameter, wherein the TLV parameter includes a type field, a length field, and a value field, the length field indicates a length of the value field, and on a condition that the length of value field is less than 128 octets, the length field consists of one octet, a most significant bit (MSB) of the length field has a value of zero, and seven least significant bits of the length field indicate the length of the value field, on a condition that the length of the value field is exactly 128 octets, the length field consists of one octet, the MSB of the length field has a value of one, and the seven least significant bits of the length field each have a value of zero, and on a condition that the length of the value field is more than 128 octets, the length field includes two or more octets that include a first octet and one or more subsequent octets, a MSB in the first octet in the length field has a value of one, seven least significant bits in the first octet in the length field indicate a length of the one or more subsequent octets, and a value of the one or more subsequent octets, when added to a value of 128, indicate the length of the value field; and a transmitter configured to transmit the MIH frame via a wireless network.

7. The wireless communication device of claim 6, wherein the frame includes an MIH header and a payload, the TLV parameter is included in the payload, and the MIH header includes a version field, an acknowledgement-request (Ack-Req) field, an acknowledgment-response (Ack-Rsp) field, an MIH Message ID field, and a Transaction ID field.

8. The wireless communication device of claim 6, wherein the wireless communication device is a wireless transmit/receive unit (WTRU).

9. The wireless communication device of claim 6, wherein the wireless communication device is a user equipment (UE).

10. The wireless communication device of claim 6, wherein the wireless communication device is a base station.

* * * * *